(12) United States Patent
Larsen

(10) Patent No.: US 7,159,611 B2
(45) Date of Patent: Jan. 9, 2007

(54) INLINE FLOW CONTROL DEVICE

(75) Inventor: Todd W. Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 292 days.

(21) Appl. No.: 10/860,688

(22) Filed: Jun. 3, 2004

(65) Prior Publication Data

US 2004/0216781 A1 Nov. 4, 2004

Related U.S. Application Data

(63) Continuation-in-part of application No. 10/194,717, filed on Jul. 12, 2002, now abandoned.

(51) Int. Cl.
*F16K 31/122* (2006.01)
*G05D 16/04* (2006.01)

(52) U.S. Cl. ................... 137/505.25; 137/508

(58) Field of Classification Search ................ 137/505, 137/505.25, 508
See application file for complete search history.

(56) References Cited

U.S. PATENT DOCUMENTS

| | | | |
|---|---|---|---|
| 2,002,450 A | 5/1935 | George | |
| 2,590,368 A | 3/1952 | Beck | |
| 2,600,137 A * | 6/1952 | Teague, Jr. | ............ 137/505.25 |
| 3,093,155 A * | 6/1963 | Dawes | ............... 137/269 |
| 3,211,175 A | 10/1965 | Replogle | |
| 3,583,431 A * | 6/1971 | Diel | ............... 137/474 |
| 3,664,369 A | 5/1972 | Johnson | |
| 4,476,888 A | 10/1984 | Lachmann et al. | |
| 4,667,695 A | 5/1987 | Gold et al. | |
| 5,309,934 A | 5/1994 | Jaeger | |
| 5,397,797 A * | 3/1995 | Ueno | ............... 514/397 |
| 5,452,741 A | 9/1995 | Tomita et al. | |
| 5,501,247 A | 3/1996 | Miller | |
| 5,826,613 A | 10/1998 | Schalk | |
| 5,913,328 A * | 6/1999 | Taube et al. | ............... 137/501 |
| 6,170,519 B1 | 1/2001 | Carroll et al. | |
| 6,412,750 B1 | 7/2002 | Jun et al. | |

* cited by examiner

*Primary Examiner*—Stephen M. Hepperle
(74) *Attorney, Agent, or Firm*—Clayton R. Johnson

(57) ABSTRACT

The inline flow control device includes housing with a tubular portion coaxially aligned with the tubular portion of a fitting threaded to the housing. A piston has a bore extending therethrough with the tubular portions extended thereinto in axial spaced relationship, the fitting tubular portion mounting a valve seat to abut against a piston internal shoulder when the piston has axially moved relative to the tubular portions to a blocking position to block fluid flow through the device. The piston enlarged diametric portion bottom surface is in fluid communication with the piston bore in both of the piston positions but not in fluid communication with the body high pressure inlet when the piston is in its blocking position. A spring resiliently urges the piston in its blocking position. Two embodiments are pressure regulators while the third is a balanced valve.

34 Claims, 5 Drawing Sheets

INLINE FLOW CONTROL DEVICE

RELATED APPLICATIONS

This application is a continuation-in-part application of U.S. Ser. No. 10/194,717, filed Jul. 12, 2002 now abandoned.

BACKGROUND OF THE INVENTION

This invention is for inline flow control devices such as pressure regulators and high flow valves that are mountable in a line between a source of pressurized fluid and an object to which fluid under pressure is to be applied.

In Gold, U.S. Pat. No. 4,667,695, there is disclosed an annular piston axially movable in a bore in a body (second piston). The annular piston is resiliently urged to a position to permit fluid flow therethrough from its inlet end to its opposite end and thence through holes in the body. With an increase of pressure at the inlet end of the annular piston, the annular piston is moved toward its closed position.

Lachmann et al, U.S. Pat. No. 4,475,888, has a valve body with lower passages converging to open to a central bore while Miller, U.S. Pat. No. 5,501,247, discloses using a key to prevent relative rotation between two parts of a pressure regulator.

In order to make improvements in inline pressure reducing regulators and valves, this invention has been made.

SUMMARY OF THE INVENTION

The inline flow control device includes a housing having a bore extending axially therethrough and in part is extended through a housing tubular portion and a high pressure inlet while a fitting is mounted to the housing to extend within the top part of the housing bore. The fitting has an outlet and a tubular portion coaxial with the housing tubular portion with a fitting bore opening to the outlet and to the housing bore axially spaced from the housing tubular portion. A piston in the housing bore has both of the housing and fitting tubular portions extended in the piston bore and is axially movable relative to the tubular portions between a position permitting fluid flow from the inlet to the outlet and a position blocking such fluid flow. One embodiment of the flow control device is an inline pressure reducing regulator that includes a regulator body (housing) having an inlet which opens through a tubular portion (sleeve) extending within a main chamber to a piston bore portion and a bonnet (fitting) having an outlet that opens through a bonnet tubular portion (sleeve) and apertures opposite the outlet to the piston bore. The piston has the body (housing) tubular portion extending into one end portion of the piston bore and the bonnet (fitting) tubular portion extending into the other end of the piston bore. A valve seat is mounted by the apertured end of the bonnet sleeve to abut against an annular shoulder in the bore of the piston to block fluid flow therethrough. A first spring abuts against the body to urge the piston to a regulator closed position while a second spring abuts against the bonnet to urge (apply a force to) the piston to move to a regulator open position when the pressure at the outlet is below a desired level. A key acts between the bonnet and regulator body to retain them in limited adjusted axial positions to permit a limited adjustment of the outlet pressure. Another embodiment of the inline fluid flow control device is a high flow balanced valve wherein tubular portions of a fitting and housing extend within a piston bore and an air pressurize signal is applied to the piston top surface for moving the piston against the action of a spring from its closed position to its open position when it is desired to have high pressure fluid flow from the housing inlet to the fitting outlet.

One of the objects of this invention is to provide new and novel means for controlling the flow of fluid from an inlet port to an outlet port. A different object of this invention is to provide a pressure reducing regulator having new and novel means for reducing the leakage paths between the regulator inlet and outlet. Another object of this invention is to provide in a pressure regulator, new and novel means for blocking fluid flow therethrough and, if there is seat leakage, the extra outlet pressure increases the seat load to block fluid flow and form a new seat area to eliminate future leakage. An additional object of this invention is to provide in an inline pressure regulator, new and novel seat means for eliminating decaying inlet effects without the sacrifice of fluid flow shutoff.

Still another object of this invention is to provide new and novel means in an inline pressure regulator to minimize the possible leakage paths between the regulator inlet and the regulator outlet. A different object of this invention is to provide new and novel means in a pressure regulator for making small adjustments in the regulator outlet pressure.

Another object of this invention is to provide a new and novel inline flow control device that is operable under a relatively low signal pressure for controlling the operation of a valve in a high pressure line. In furtherance of the last mentioned object, it is a further object of this invention is to provide new and novel balance valve means in a high pressure line for controlling the flow of fluid from a source of pressurized fluid to selected apparatus.

Even though for convenience terms such as "upper", "lower", "top" and "bottom" will be used in describing the pressure regulator and high flow valve, it is to be understood that the usage of these terms is applicable to when the pressure regulator or valve is in an upright position such as illustrated. However, it is to be further understood that the pressure regulator and valve may be used in other than an upright position.

DESCRIPTION OF THE PREFEERRED EMBODIMENTS

Figure 1:
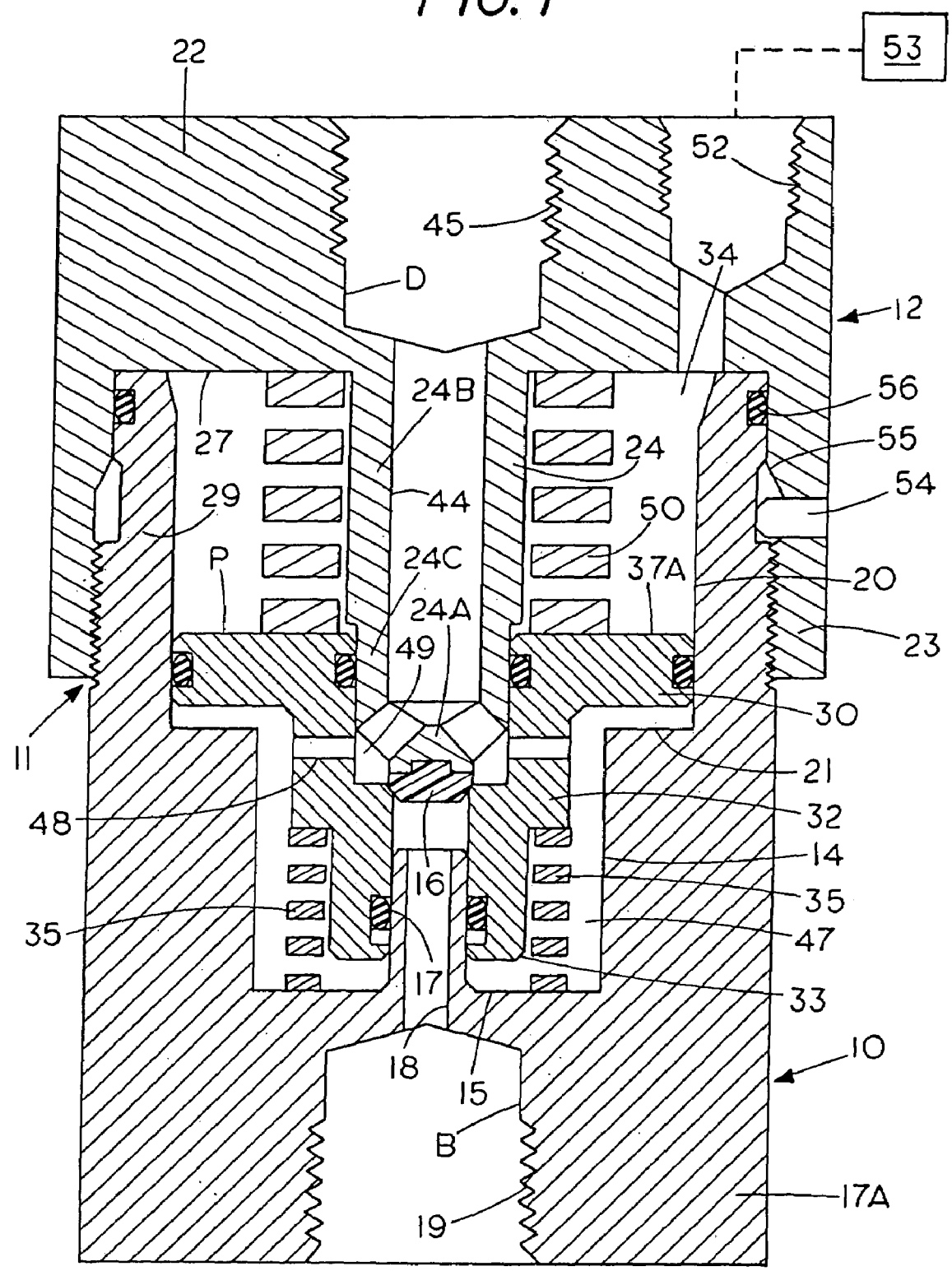
FIG. 1 is a cross sectional view of the first embodiment of the inline flow control device of this invention that shows pressure regulator apparatus in its piston closed position for blocking fluid flow therethrough.
Figure 2:
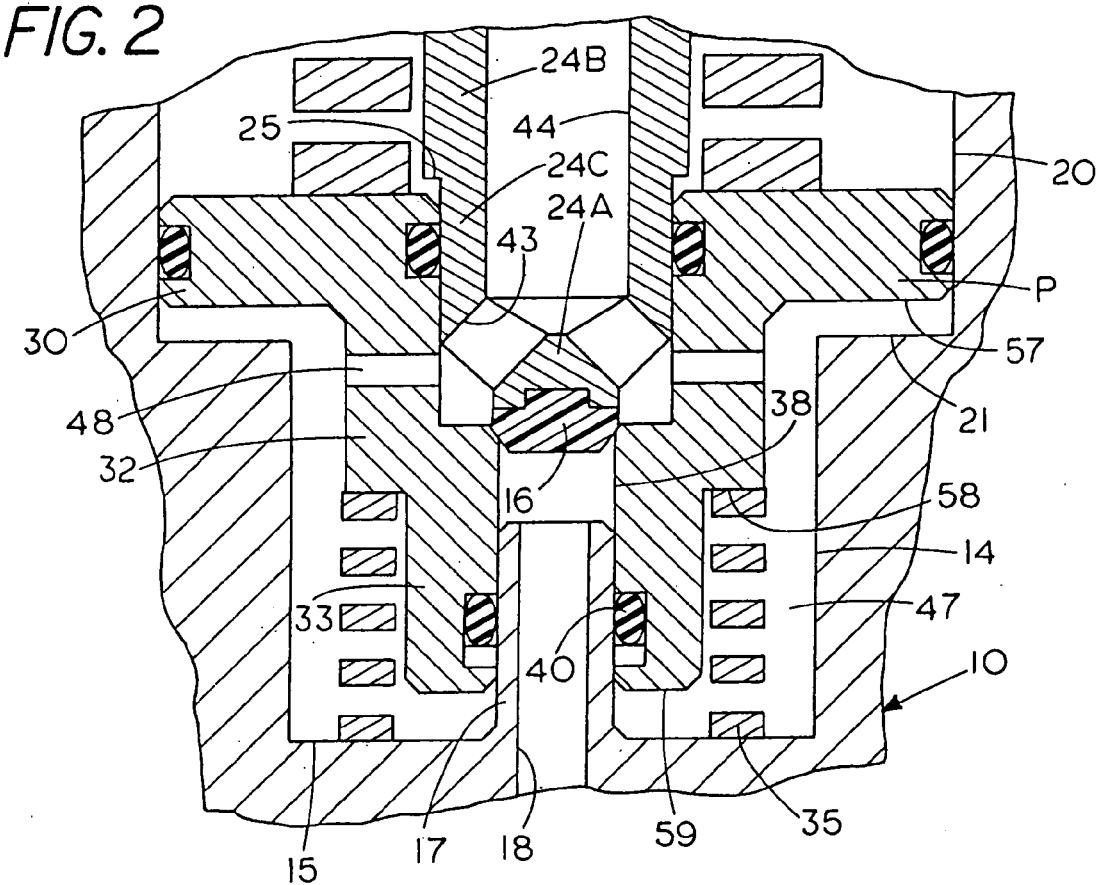
FIG. 2 is an enlarged fragmentary view of a portion of the structure of FIG. 1.
Figure 3:
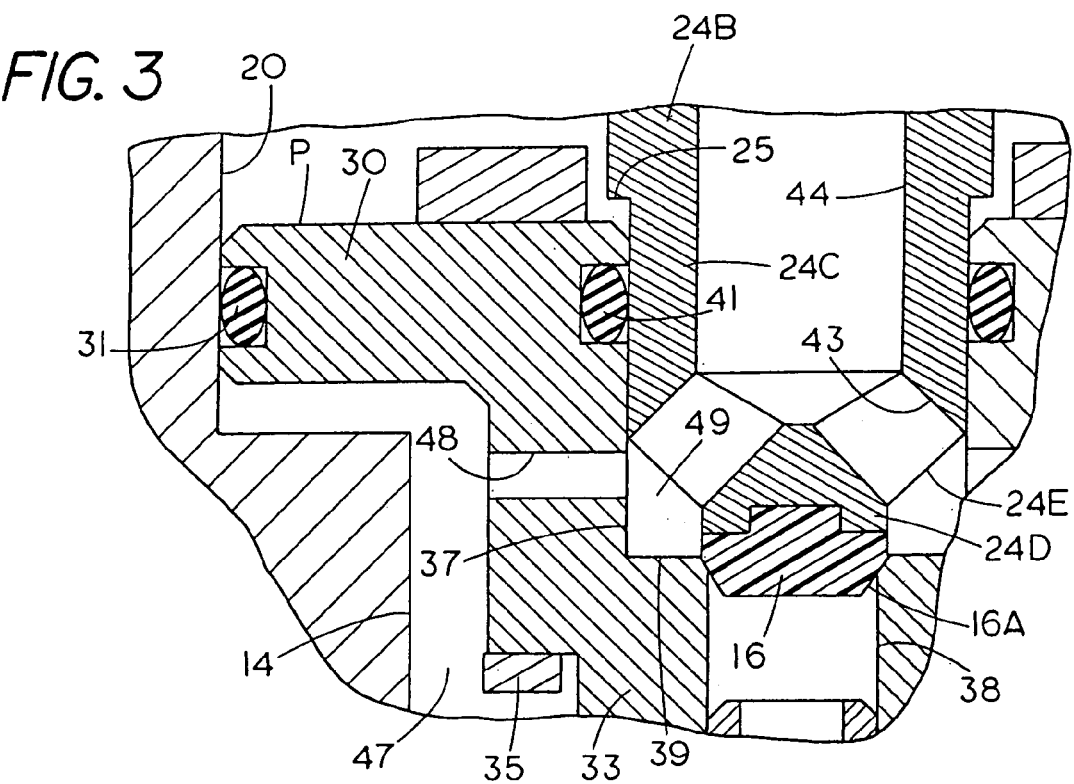
FIG. 3 is a still further enlarged view of the valve seat area of the regulator of FIG. 1.

Referring to FIG. 1 of the drawings, the inline flow control device (pressure regulator apparatus) of the first embodiment of the invention, generally designated 11, includes a regulator body (housing), generally designated 10, with a bore B of varying diameters extending axially therethrough. A bonnet (cap or fitting), generally designated 12, is threadedly mounted to the upper portion of the body to close the upper end of the body bore. The bonnet has a bore D extending axially therethrough, other than for a valve seat 16 and the valve seat mount 24A, and is coaxial with the body bore.

The body bore B includes an axially intermediate bore portion 14 that is in part defined by an annular bottom wall 15 with an axially elongated sleeve (tubular portion) 17 integrally joined to the body lower part and extended axially a smaller distance above the bottom wall 15 than the axial dimension of the bore portion 14. The sleeve has a bore portion 18 extending axially therethrough and opens to the body pressurized body inlet (port) 19 in the body part 17A, the bore portion 18 and inlet being parts of the body bore B. Thus, the sleeve opens to the intermediate bore portion axially intermediate its axially opposite ends. The bore portion 18 is of a much smaller diameter than that of each of the body intermediate bore portion and the inlet.

The body bore B also includes an enlarged diameter bore portion 20 that at its juncture with the axially intermediate bore portion forms an annular shoulder 21 and opens through the top annular edge of the regulator body to the annular part 23 of the bonnet 12. The bore portion 20 is of a constant diameter for at least substantially the entire distance above the shoulder 21.

The bonnet annular portion 23 extends downwardly from the top part 22 of the bonnet, the lower part of the annular portion being threadedly mounted to the regulator body. The bonnet also has an axially elongated tubular portion (sleeve) 24 integrally joined to and extending downwardly from the top part in coaxial relationship to the body sleeve, and advantageously is of a greater axial length than the bonnet annular portion 23. Thus, the bonnet top part has a wall 27 that in part defines an annular chamber opening to the body enlarged bore portion and has the upper annular part 29 of the regulator body extended thereinto.

The bonnet tubular portion has a top part 24B that is of a given outer diameter for the major part of its length from the bonnet top part and has a reduced outer diameter part 24C to, at its juncture to the top part 24B, form a downwardly facing shoulder 25. The reduced diameter part 24C at its lower end has the valve seat mount 24A formed integrally therewith. The seat mount at its upper end is of the same outer diameter as that of the tubular part 24C with the major base of a lower frustoconical portion 24E joined thereto. The frustoconical portion has its minor base joined to a cylindrical portion 24D. The reduced diameter part of the valve seat is extended into a socket in the cylindrical portion, the lower part of the seat being of a frustoconical shape for purposes that will be referred to hereinafter. The valve seat may be press fitted or otherwise suitably adhered to the seat mount without there being any threaded connection. The valve seat, in constantly being subjected to the high fluid pressure in the piston bore portion 38, acts to more firmly retain the valve seat mounted to the bonnet seat mount. As a result of the valve seat being mounted without the use of threads, there is a decreased chance of particle generation during assembly which generation could result in leakage flow bypassing the valve seat.

Mounted in the body bore portions 14, 20 for axial movement is annular piston (sensor) P, the piston having an enlarged diameter portion 30 to form a close sliding fit with the body wall portion that defines the cylindrical part of bore portion 20. The enlarged diametric portion has an annular groove with an O-ring 31 to form a fluid seal with the bore portion wall during the entire axial movement of the piston relative to the bonnet tubular portion. Further, the piston has an axial intermediate portion 32 joined to the enlarged diameter portion to extend downwardly thereof in bore portion 14 to provide a downwardly facing shoulder 57 and is of a significantly smaller diameter than bore portion 14. The piston also includes a reduced diameter portion 33 joined to the intermediate portion 32 to extend downwardly thereof to provide a shoulder 58 against which a coil spring 35 abuts. The opposite end of the spring abuts against the bottom wall 15 to constantly resiliently urge the piston axially away from the bottom wall 15. The movement of the piston in the opposite axial direction is limited by the piston enlarged diametric portion 30 abutting against the shoulder 21.

The piston has a top bore portion 37 opening through the top surface thereof and has the bonnet tubular portion 24C extended thereinto. The piston enlarged diametric portion has an internal groove with an O-ring 41 therein to provide a fluid seal with the tubular portion 24C as the piston moves axially relative to the tubular portion 24C. The axial movement of the piston axially away from the bottom wall 25 is limited by abutting against the shoulder 25.

The piston bore includes a lower bore portion 38 of a smaller diameter than that of bore portion 37 to provide an annular upwardly facing shoulder 39, the diameter of bore portion 38 being greater than the minimum diameter of the minor base of the frustoconical part 16A of the valve seat, but less than the maximum diameter of the major base of the frustoconical part 16A. The wall of the piston that defines bore portion 38 is of a diameter to form a close axial sliding fit with the body tubular portion 17, the piston reduced diameter portion 38 having an internal groove in which an O-ring 40 is mounted to form an axial fluid sealing fit with the tubular portion 17 during the entire axial movement of the piston relative to the tubular portion.

The frustoconical part 24E has a plurality of apertures 43 that converge upwardly to open to the bore 44 of the bonnet tubular portions 24B, 24C which in turn opens to regulator outlet (port) 45 in the bonnet top portion 22. The apertures open to the annular clearance space 49 that is, at least in a substantial part, bounded by shoulder 39, the wall of the piston that defines the lower part of the piston bore portion 37, the seat mount and the valve seat when the piston is in its closed (fluid flow blocking) position. When the piston is in its closed position, it has an axial intermediate part of the seat frustoconical portion 16A abutting against the piston at the juncture of the piston bore portions 37, 38 to block fluid flow from tubular portion bore 17 to the piston bore portion 37. Radial cross bores 48 are provided in the piston axial intermediate portion 32 to open to the clearance space 49 and to the annular clearance space (main chamber) 47 between the piston wall defining bore portion 14 and the part of the piston that extends below the piston enlarged diametric portion. The transverse area of the clearance space 47 is greater than that of the piston shoulder 39 such that even if the part of the bottom surface of the piston enlarged diametric portion were to abut against shoulder 21 and the part of the bottom surface piston of the piston reduced diameter portion were to abut against the body bottom wall 15, the part of the piston bottom surface subjected to pressurized fluid is sufficiently great to move the piston toward its closed position against the action of a coil spring 50 when the fluid pressure in the annular space 47 is at or above the preselected outlet pressure.

The coil spring 35 constantly resiliently urges the piston to a position that the part of the piston surrounding the opening of bore portion 38 to bore portion 37 abuts against the frustoconical part of valve seat to block high pressure fluid flow through the piston bore. The coil spring 50 is in the bore portion 20 and acts between the bonnet top portion surface 27 and the top surface 37A of the piston to resiliently urge the piston to move relative to the bonnet tubular portion 24 to a regulator open position to permit high pressure fluid flow through the regulator. The spring 50 will retain the piston in an open position to place the bonnet tubular portion in fluid communication with the cross bores 48 and thereby with the annular clearance space 47 when no fluid under pressure is applied at the body inlet 19.

A stop screw 54 is threaded into the bonnet and extended into a regulator body annular groove 55 that is of a sufficient axial dimension to permit unthreading of the screw and then rotating the bonnet relative to the regulator body and thence threading the screw to abut against the regulator body for retaining the bonnet relative to the regulator body in an adjusted threaded (angular) position. Since such a threading adjustment varies the axial distance between the bonnet top portion surface 27 and the body shoulder 21, this provides small outlet pressure adjustments without the use of shims that are commonly used in conventional inline regulators. The annular groove is provided above the threaded connection between the regulator body upper portion 29 and the bonnet portion 23 while an O-ring 56 provides a fluid seal between the body portion 29 and bonnet portion 23 above the annular groove.

The bonnet has a vent port 52 that opens to the cavity (chamber) 34 between the tubular portion 24 and the body portion 29 axially between the top portion surface 27 and the piston. The leakage fluid in the above mentioned chamber can flow through the port 52 to a suitable container 53 for leakage gas or otherwise plumbed to a safe area. With the above bonnet-piston-regulator-O-ring arrangement, any and all leakage flow bypassing the O-rings flows through the port 52. Further, with this arrangement, the number of possible leakage paths between the inlet and outlet are reduced.

The outlet pressure can be adjusted by using springs 35 and 50 having the desired spring characteristics and the appropriate threaded adjustment of the bonnet relative to the regulator body. Due to the fluid connection of the outlet through the bonnet tubular portion bore 44 apertures 43, annular space 49 and cross bores 48, the outlet pressure acts against the downwardly facing, annular piston shoulders 57, 58, 59 which are of much greater cross sectional area than the corresponding maximum transverse cross sectional area of the valve seat. When the outlet pressure decreases below a preselected valve, the spring 50 moves the piston downwardly and thereby the juncture of the piston bore portions 37, 38 axially away from the valve seat. As a result, high pressure fluid flows from the inlet 19, through bore portion 38 to pass through the annular clearance space 49 between the valve seat and the piston bore to the apertures 43 and thence to the tubular portion bore 44 to flow to the bonnet outlet 45. At the same time the annular space 49 is in fluid communication with the space 47 and thereby with the piston shoulders 57–59. As the fluid pressure at the outlet 45 increases, the pressure acting against the piston bottom surface increases and the spring 50 is increasingly compressed, the piston moves toward a valve closed position and, upon the fluid pressure at the outlet increasing to the preselected level, blocks fluid flow from the inlet to the annular space 49.

To be noted is that as the inlet pressure decreases (for example as a result of the emptying of the gas in a gas supply tank), when the piston is it open position, the pressure on the bottom surfaces decreases and the spring 50 moves the piston in a further opening direction. As a result, as the inlet pressure decreases there is an outlet increase to eliminate the decaying inlet effect. Even though not mentioned, it is to be understood that the movement of the piston to its open position may be of varying axial spacing of the regulator sleeves from one another as a result of the rate of fluid flow required to maintain the desired outlet pressure. Thus, in the piston open position, the valve seat may just be slightly spaced from the juncture of the piston bore portions 37, 38 to permit a low rate of flow through the regulator to a maximum spacing to permit a higher rate of flow through the regulator.

In the event there is leakage flow past the valve seat, there is leakage fluid flow into the annular space 49 and thence through the cross bores to act against the piston bottom surfaces. Due to the transverse annular area of the piston surface 39 being many times smaller than the combined transverse area of the piston surfaces 57–59 and the valve seat being made of a material, for example plastic, that is more easily deformable than that of the piston, the increasing leakage pressure acting against the piston forces the valve seat to deform sufficiently that there is a new seating of the piston against the valve seat to block bypass leakage flow. This seating action provides an increased resistance to seat leakage caused by vibration. The valve seat is made of a material that if deforms only the amount necessary to form a new seating (annular point of contact of the valve seat with the piston) to block the leakage flow. After the piston moves to its open position subsequent to the new seating, the piston, in again moving to its closed position, resumes its new seating.

Advantageously, each of the bonnet, including its tubular portion, and the regulator body, including its tubular portion, and the piston is made of a single, unitary piece of material with each the members having its parts integrally joined to one another. As a result, the number of O-rings and the chance of leakage are reduced. Further, the bores of the piston, regulator body, bonnet, other than for the cross bores and apertures 43, of the first embodiment are coaxial.

Figure 4:
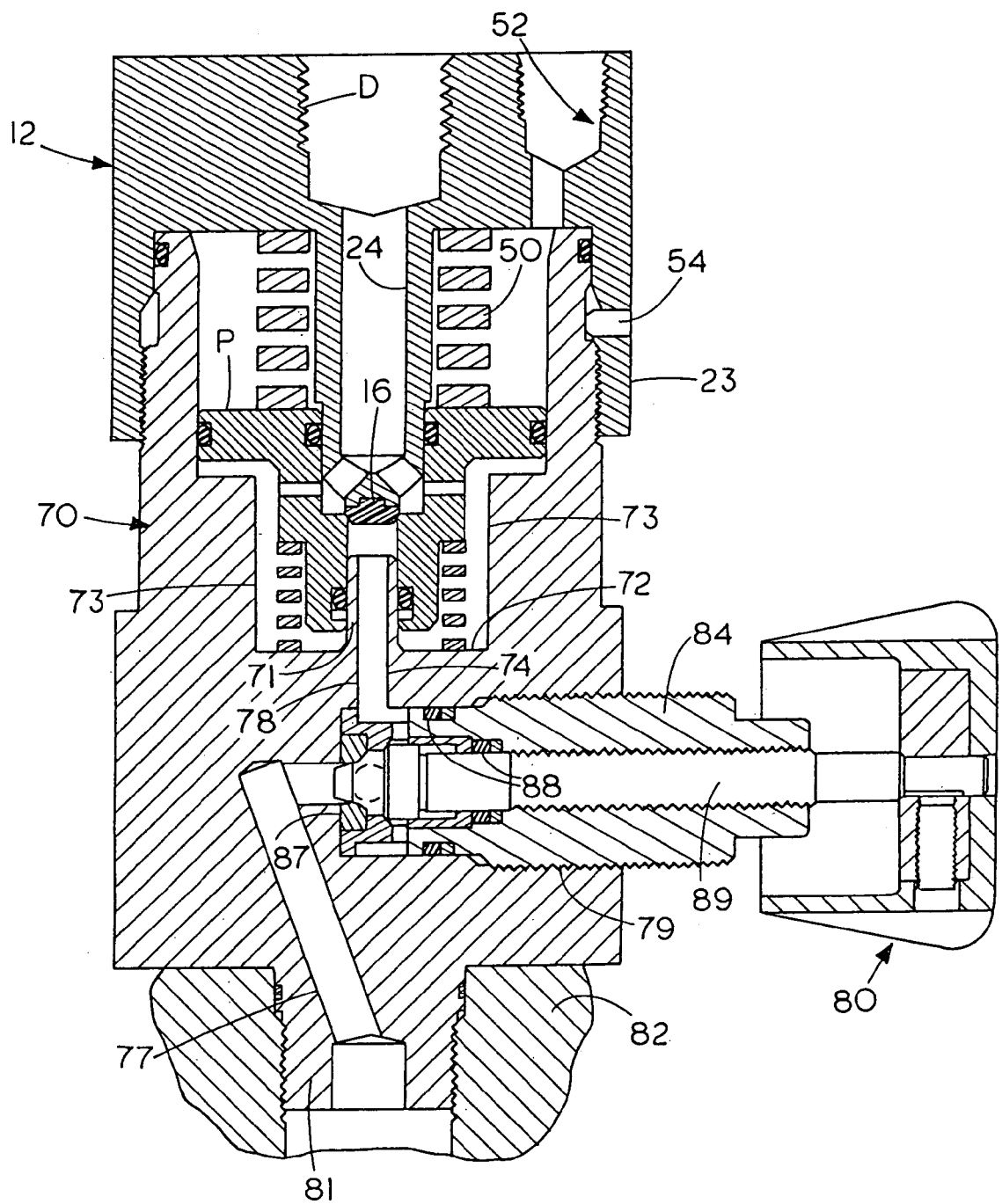
FIG. 4 is a cross sectional view of the second embodiment of the invention.

Referring to FIG. 4, the second embodiment of the flow control device of the invention includes a bonnet (cap or fitting) 12, a piston P and a coil spring 50 that are the same as those of the first embodiment and function in the same manner. The second embodiment also includes a regulator (housing) body, generally designated 70, having a bore 73 that is in part defined by a bottom wall 72, and a sleeve 71 that are the same as the same parts of the first embodiment. However, the regulator body of the second embodiment differs from that of the first embodiment in that it incorporates a valve bore 79 for having a shutoff valve, generally designated 80, threaded therein. A passage (bore portion) 78 extends axially through the sleeve 17 and has an inlet 74 that opens to the bore 79. An inlet passage 77 opens to the bore 79 and through the externally threaded neck portion 81, the threaded portion being threadedly mountable to the discharge neck portion of a convention gas tank 82.

The shutoff valve 80 includes a valve body 84 threadedly mounted to the regulator body bore 79 and a valve stem 89 rotatably mounted by the valve body for selectively permitting fluid flow through the valve seat 87 from the passage 77 to the passage 78, the valve seat being mounted in the regulator body bore. There are provided O-rings 88 for forming a fluid seal between the regulator body and the valve body and a fluid seal between the valve stem 89 and the valve body. By incorporating the shutoff valve in the regulator body, no external plumbing is required for connecting the pressure regulator to a high pressure gas tank 82. Thus, the shutoff valve can be used for controlling the flow of high pressure fluid from the high pressure source (gas tank) to the regulator body tubular portion 71.

Figure 5:
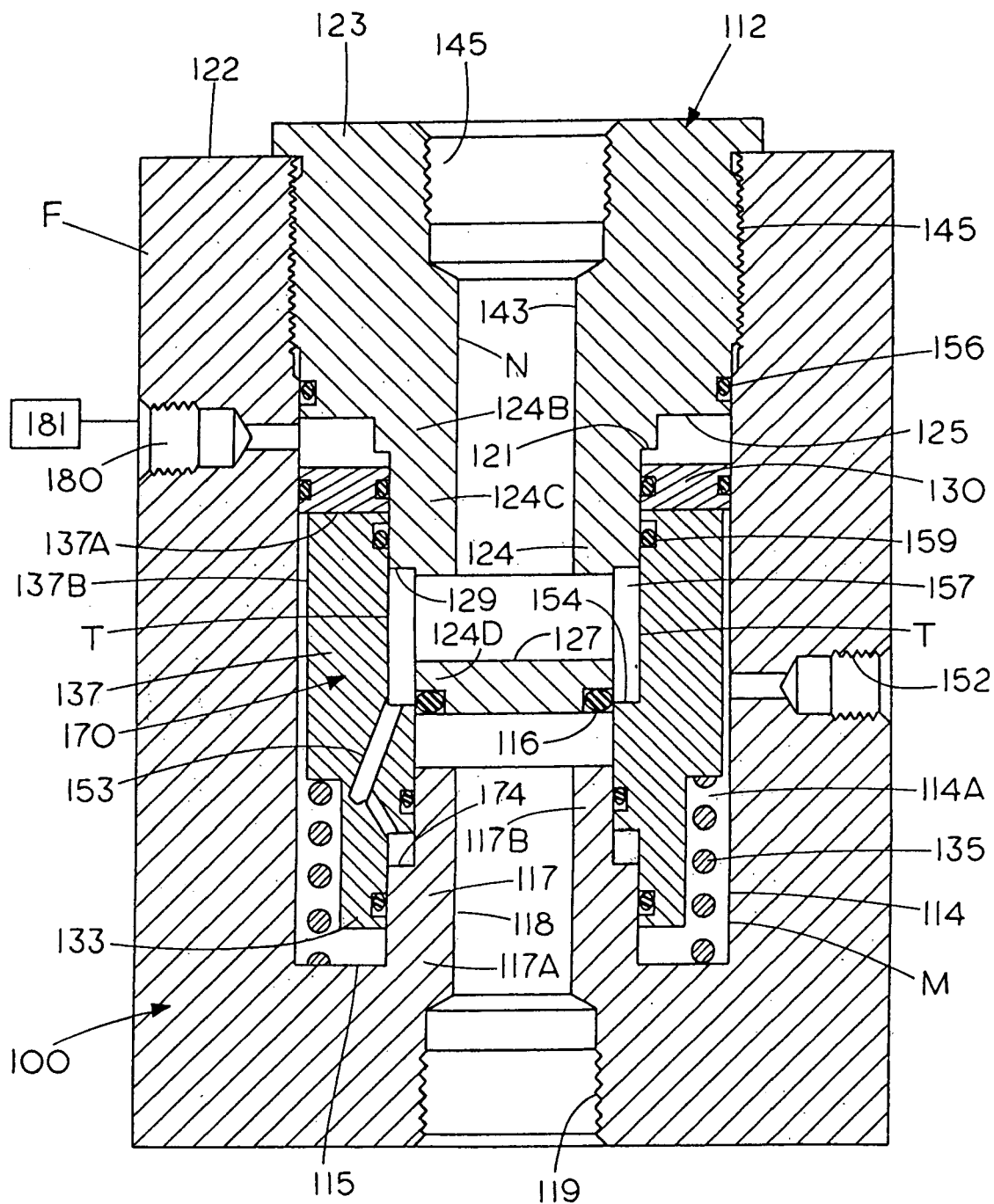
FIG. 5 is a cross sectional view of the third embodiment of the inline flow control device of this invention in its piston closed position for blocking fluid flow therethrough.
Figure 6:
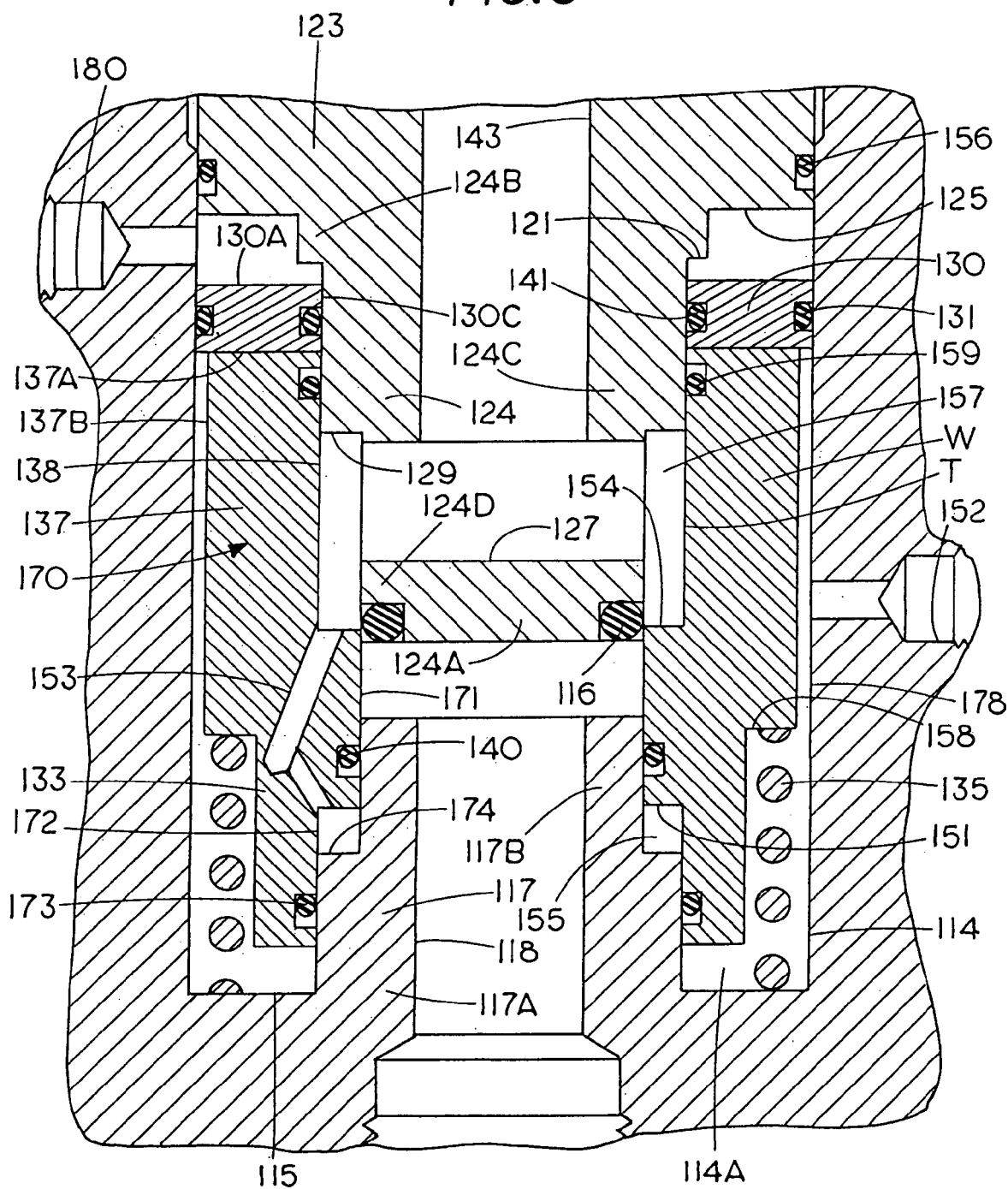
FIG. 6 is an enlarged fragmentary view of a portion of the structure of FIG. 5.

Referring to FIGS. 5 and 6 of the drawings, the inline fluid flow control device F of the third embodiment of the invention is a high flow balanced valve that includes a valve housing (valve body), generally designated 100, with a housing bore M of varying diameters extending axially therethrough. A fitting (cap), generally designated 112, is threadedly mounted to the upper portion of the housing to close the upper end of the housing bore. The fitting has a bore N that includes a bore portion extending axially the major part of the axial dimension of the fitting to be coaxial with the housing bore.

The housing bore M includes an axially intermediate bore portion 114 that is in part defined by an annular bottom wall 115 with an axially elongated sleeve (tubular portion) 117 integrally joined to the body lower part and extending axially a smaller distance above the bottom wall 115 than the axial dimension of the bore portion 114. The housing sleeve has a bore portion 118 extending axially therethrough and opens to the body inlet (port) 119 for pressurized fluid, the bore portion 118 and inlet being parts of the housing bore M. Thus, the sleeve opens to the intermediate bore portion 114 axially intermediate it's axially opposite ends. The bore portion 118 is of a much smaller diameter than that of each of the body intermediate bore portion and the inlet.

The housing bore M also includes an internally threaded bore portion 145 for having the fitting threaded therein and opens through the top surface 122 of the housing body and to the bore portion 114. The bore portion 114 is of a constant diameter for at least substantially the entire distance above the bottom wall 115 of bore portion 114 to the housing threaded portion.

The fitting has an annular top part 123 that includes an annular portion threadedly mounted to the valve body 100. The fitting also has an axially elongated tubular portion (sleeve) 124 that includes a top part 124B integrally joined to and extending downwardly from the top part in coaxial relationship to the body sleeve to provide a downwardly facing shoulder 125. An O-ring 156 forms a fluid seal between the fitting and the housing axially between the shoulder 125 and the fitting threaded portion. Joined to the tubular portion top part 124B is a reduced outer diameter part 124C to at its juncture form a downwardly facing shoulder 121. The reduced diameter part 124C at its lower end has a smaller diameter part 124D joined thereto to provide a downwardly facing shoulder 129. The lower end of portion 124D provides a valve seat mount 124A for mounting the valve seat 116. The bore N of the fitting tubular portion 124 has a bore portion 143 opening to the threaded bore portion (port) 145 and through cross bore 127 to the annular clearance space 114A. The bore portion 143 is in coaxial alignment with the bore portion 118. The clearance space 114A is in part defined by the annular bottom surface 115 of bore portion 114, the fitting and the housing wall portion defining bore portion 114.

The housing sleeve includes a bottom sleeve portion 117A of the same outer diameter as that of fitting portion 124C and a top sleeve portion 117B of a slightly smaller outer diameter than the outer diameter of the valve seat. The juncture of the housing sleeve portions 117A, 117B provides an upwardly facing shoulder 174. The top annular edge of the housing sleeve is axially spaced from the bottom surface of the fitting sleeve, the sleeves being in coaxial alignment.

Mounted in the housing bore portion 114 for axial movement is annular piston (valve member or sensor) W which has a bore T extending axially therethrough, the piston having an enlarged diameter portion 130 with a bore portion 130C. A extending axially therethrough and forming a part of the piston bore. The enlarged diametric portion forms a close sliding fit with the housing wall defining bore portion 114. The enlarged diametric portion has an annular groove with an O-ring 131 to form a fluid seal with the housing bore portion wall and an O-ring 141 in a radial inner groove to form a fluid seal with the tubular portion 124C during the entire axial movement of the piston enlarged diametric portion relative to the fitting tubular portion 124C. Further, the piston includes a lower piston portion, generally designated 170, which includes a top portion 137 having a top surface 137A and an outer peripheral surface 137B of a slightly smaller diameter than bore 114 to provide an annular clearance space 178. The clearance space 178 opens to the piston enlarged diametric portion. The piston lower portion has bottom part 133 that is of a smaller outer diameter than that of the lower portion top part 137 to form a downwardly facing annular shoulder 158. A coil spring 135 is provided in the main chamber 114A to abut against the body wall 115 and the shoulder 158 to constantly resilient urge the piston to a fluid flow closed (blocking) position to block fluid flow through the piston bore. The piston lower portion 137 has its top surface 137A resiliently retained in abutting relationship to the piston enlarged diametric portion by the coil spring 135 and away from the bottom wall 115. The movement of the piston in the axial direction away from the bottom wall is limited by the piston enlarged diametric portion 130 abutting against the shoulder 121.

The piston bore T includes an axially intermediate, reduced inner diameter bore portion 171 which is of a diameter to form an axial sliding fit with the housing sleeve top part 117B, there being an O-ring 140 forming a fluid seal between the housing wall forming the lower part of the piston reduced diameter portion 171 and the sleeve top part 117B. Below the reduced diameter tubular portion 117B, the piston bore has a lower larger inner diameter portion 172 with there being an O-ring 173 forming a fluid seal between the housing sleeve lower portion 117A and the piston. Piston bore portions 171, 172 at their juncture provide a downwardly facing shoulder 151 that is abuttable against shoulder 174 to limit the movement of the piston in an opening direction.

The top bore portion 138 of the piston bore in the piston lower portion opens to the bore portion 130C and is of the same inner diameter. Further, bore portion 138 is of the same inner diameter as bore portion 172 and opens to bore portion 171 to form an upwardly facing shoulder 154 which is of substantially the same radial dimensions as shoulder 151. At the upper end of the piston lower portion there is an O-ring 159 to provide a fluid seal between bore portion 138 and the fitting portion 124C.

The piston, in being axially movable in the main chamber (clearance space) 114A relative to the fitting, there is provided an axially variable annular clearance space 157 which is between the shoulders 129 and 154 and an axially variable annular clearance space 155 between the shoulders 151, 174. Advantageously, in the piston closed position, the axial spacing of shoulders 151, 174 is about the same as, or slightly less than, the axial spacing of the lower transverse surface of the piston lower portion from the bottom wall 115 but is substantially less than that of shoulder 129 from shoulder 154. Since the clearance spaces 155 and 157 are of the same radial dimensions, the O-rings 173, 159 are of the same diameter and a fluid passage 153 fluidly connects clearance spaces 155, 157, very little pressure, for example 100 psi, is required to move the piston between its blocking (closed) position to its open position (balance valve) even though the inlet pressure is very high, for example 10,000 psi.

The fitting tubular portion lowest part 124D has a cross bore (passage) 127 that opens to the lower end of bore portion 143 and to the clearance space 157 both when the piston is in its fluid flow blocking position and in its fluid flow open position. When the piston is in its closed position, the valve seat abuts against the shoulder 154 at the juncture of the piston bore portions 138, 171 to block fluid flow from tubular portion bore 118 to the piston bore portion 143. The passageway 153 in the piston lower portion 170 opens to the annular clearance space 157 below the piston enlarged diametric portion in both the piston open position and fluid flow blocking position.

In the event there is a failure of O-ring 159 and high pressure fluid bypasses the valve seat, high pressure acts against the piston enlarged diametric portion 130 to move it away from the piston lower portion 170 to allow fluid flow from the clearance space 157 to the space axially between the piston portions and thence radially to the annular clearance space 178 to the vent (leakage) port 152 to be connected to a suitable storage container (not shown) or to the ambient atmosphere in the event the fluid is of a type that it is not objectionable to be so vented it or otherwise plumbed to a safe area. With the above fitting-piston-housing-O-ring arrangement, the number of possible leakage paths between the inlet and outlet are reduced.

For moving the valve member (piston) W to its open position, there is provided a signal air (fluid) inlet (port) 180 that opens to the main chamber 114A axially between the piston enlarged diametric portion and fitting shoulder 125 for applying air under pressure to the top surface 130A of the piston enlarged portion when the piston is in either of its fluid flow blocking position or open position. When a fluid pressure signal is provided at port 180 is provided from a conventional source 181, pressurized fluid acts against the piston enlarged diametric portion so that the piston enlarged and lower portions are forced axially downwardly to move the piston shoulder 154 away from the valve seat to the piston open position. When the piston is in an open position, there is a high pressure flow path from the inlet 119, through bore portion 118 and clearance space 157 to the cross bore 127, and through the fitting bore portion 143 to the outlet port 145. When the air pressure signal is discontinued, the piston is resiliently moved to its closed position by spring 135. It is noted that when the piston is in its closed position, the pressure in chamber 157 is the same as that in chamber 155 which is the outlet pressure while when the piston is in its open position, the pressure in chambers 155, 157 is substantially the same as the inlet pressure. It is noted that the outer diameter of the valve seat is substantially the same as the inner diameter of the O-ring 140.

Even though less desirable than having the piston of the third embodiment being made of a two part construction because of the possible leakage of O-ring 159, it is to be understood that the piston may be of a single piece construction wherein the lower piston portion 170 is not axially movable independent of the enlarge diametric portion but is fixedly joined thereto.

Advantageously, for the third embodiment, each of the fitting, including its tubular portion, and the housing, including its tubular portion, and the piston lower portion 170 is made of a single, unitary piece of material with each of the members having its parts integrally joined to one another. As a result, the number of O-rings and the chance of leakage are reduced. Further, the bores of the piston, housing and the fitting, other than for the passage 153, the cross bore 127 and the ports 180, 157 and the opening of the ports to the body bore M are coaxial.

What is claimed is:

1. Inline flow control apparatus, comprising a housing having an upper end, a tubular portion and an axial bore having an inlet for pressurized fluid and opening through housing tubular portion and the housing upper end, the housing bore having an axially intermediate bore portion, a fitting removably mounted to the housing and having a top portion, an outlet opening through the top portion and an axially elongated tubular portion extending downwardly from the fitting top portion and having a lower end portion, a piston axially movably extended within the intermediate bore portion and in fluid sealing relationship to the housing wall defining the housing bore, the piston having a top surface and an axially opposite bottom surface within the housing intermediate bore portion portion to which the intermediate bore portion opens, the piston being axially movable along the fitting tubular portion between a fluid flow open position and a fluid flow blocking position and having a first axial bore portion, and a second bore portion having the fitting tubular portion extending therein in both of the piston positions and being in fluid communication with the piston first bore portion, first spring means for resiliently urging the piston to move to its blocking position, the spring means being in abutting relationship to the piston bottom surface, means for applying pressure to the piston top surface for forcing the piston to move from it blocking position to its open position, the fitting tubular portion having a fluid passageway opening to the outlet and to the piston bore second portion, a valve seat mounted to the fitting tubular portion lower end portion and being abuttable against the piston to block fluid flow from the inlet to the passageway when the piston is in its blocking position and to permit fluid flow from inlet to the fitting passageway when the piston is in its open position, and cooperating means for applying pressurized fluid from the inlet to at least part of the piston bottom surface and to the fitting tubular portion passageway when the piston is in its open position and pressurized fluid is being applied at the inlet and blocking the application of fluid under pressure from the inlet to the at least part of the piston bottom surface and to the fitting tubular portion passageway when the piston is in its blocking position, the cooperating means at least in part being defined by the piston and at least one of fitting and the housing.

2. The inline flow control device apparatus of claim 1 wherein the cooperating means includes a fluid flow path in the piston that opens to said least part of the piston bottom surface in both of the piston positions and to the fitting tubular portion passageway in both of the piston positions whereby the said at least part of the piston bottom surface is subjected to the fluid pressure at the outlet when the piston is in its blocking position and to the pressure at the inlet when the piston is in its open position.

3. The inline flow control apparatus of claim 1 wherein the means for applying pressure to the piston top surface comprises a spring acting between the fitting and the piston top surface for moving the piston to its open position when the fluid pressure at the outlet is below a preselected level.

4. The inline flow control apparatus of claim 1 wherein the cooperating means includes a housing tubular portion bore portion that opens to the inlet, and the housing tubular portion is axially extending, is coaxial with the fitting tubular portion and extends within the piston first bore portion in axially spaced relationship to the fitting tubular portion and the valve seat, both in the piston open and blocking positions.

5. The inline flow control apparatus of claim 4 wherein each of the fitting, including its tubular portion, the housing, including its tubular portion and the piston is made of a single, unitary piece of material.

6. The inline flow control apparatus of claim 1 wherein the piston first bore portion is of a smaller diameter than the piston second bore portion to form a first annular shoulder that comprises part of the cooperating means, the valve seat in the blocking position abutting against the piston adjacent to the annular shoulder.

7. The inline control apparatus of claim 6 wherein the fitting tubular portion lower portion, the wall defining the piston second bore portion and the shoulder provide an annular clearance space, the fluid passageway opens to said clearance space and the cooperating means includes said clearance space and a piston fluid passage permitting the flow of fluid from the clearance space to said least part of the piston bottom surface.

8. The inline flow control apparatus of claim 7 wherein the piston has an enlarged diametric portion, the fitting tubular portion and the piston enlarged diametric portion at least in part define an annular clearance space extending axially between the piston and the fitting top portion and the means for applying pressure to the piston top surface comprises a signal fluid inlet in the housing that opens the last mentioned clearance space for applying fluid under pressure thereto for moving the piston from its blocking position to its open position.

9. The inline flow control apparatus of claim 8 wherein the piston includes a lower piston portion having a top surface abuttable against the piston enlarged diametric portion, the piston bottom surface and an outer peripheral surface that in combination with the housing wall defining the housing intermediate bore portion at least in part provide an annular clearance space and the enlarged diametric portion is axially movable relative to the piston lower portion.

10. The inline flow control apparatus of claim 9 wherein the cooperating means includes a housing tubular portion housing bore portion opening to the inlet and to the piston first bore portion, the housing tubular portion having a top annular part and a bottom annular part that opens to the housing inlet and is of a larger diameter than the housing tubular portion bottom part to provide an upwardly facing shoulder, the piston lower portion includes the piston first bore portion that includes a top bore part in fluid sealing relationship with the housing tubular portion top part in both of the piston positions and a bottom bore part in fluid sealing relationship to the housing tubular portion bottom part in both of the piston positions, the piston top bore part being of a smaller diameter than the piston bottom bore part to provide a downwardly facing shoulder and the cooperating means includes a piston fluid flow path from the fitting passageway to open to the piston and housing tubular portion shoulders in both of the piston positions.

11. The inline flow control apparatus of claim 10 wherein, with the piston in its closed position, the fitting lower portion peripheral wall and the wall defining the piston second bore portion in part define an annular clearance space that is part of the cooperating means and is substantially the same radial dimension as that of the radial spacing of the fitting lower end portion from the piston lower portion top bore part to provide a balance valve.

12. A pressure reducing regulator, comprising a regulator body having an upper end and an axial bore opening through the body upper end, the body bore including an axially intermediate bore portion that is in part defined by a body cylindrical wall and a bottom wall remote from the upper end, an axially elongated tubular portion having a bore portion extending axially therethrough, extending within the intermediate bore portion and opening to the intermediate bore portion, the body tubular portion having a first end part remote from the body bottom wall, a bonnet removably mounted to the regulator body and having a top portion with an outlet, a bore opening to the body bore and an axially elongated tubular portion extending within the bonnet bore coaxially with the body tubular portion in axially spaced relationship thereto, the bonnet tubular portion having a first end part axially adjacent to the body tubular portion first end part, a piston axially movably extended within the intermediate bore portion and in fluid sealing relationship to the body wall defining the body bore, the piston being axially movable between a fluid flow open position and a closed position to block fluid flow and having a first axial bore portion with the body tubular portion extending therein, and a second bore portion having the bonnet tubular portion extending therein and being in fluid communication with the piston first bore portion, the bonnet tubular portion having a fluid passageway opening to the outlet and to the piston bore second portion, a valve seat mounted to the bonnet tubular portion first end part to block fluid flow from the body tubular portion to the passageway when the piston is in its closed position and to permit fluid flow from the piston first tubular portion to the piston second tubular portion when the piston is in its open position, first spring means for resiliently urging the piston to move to its open position and second spring means for resiliently retaining the piston in its closed position until the fluid pressure at the outlet decreases below a preselected value.

13. The pressure reducing regulator of claim 12, wherein the regulator body has a threaded portion, the bonnet has a threaded portion forming a mating fit with the regulator threaded portion to removably mount the bonnet to the body, and a key for retaining the bonnet in selected adjusted threaded positions relative to the regulator body to permit adjusting the axial spacing of the tubular portions relative to one another and thereby an adjustment of the fluid pressure at the outlet.

14. The pressure reducing regulator of claim 12 wherein the regulator body bore has an enlarged diametric bore portion opening to the intermediate bore portion and opening toward the bonnet top portion axially opposite its opening to the intermediate bore portion, the piston has an enlarged diameter first portion in the body enlarged diametric portion and a second piston portion of a smaller diameter than the first piston portion and extending within the body intermediate bore portion to provide a first clearance space therewith, the piston having a bore opening to the passageway and to the clearance space both when the piston is in its open position and in its closed position.

15. The pressure reducing regulator of claim 14 wherein the bonnet tubular portion includes an axially elongated tube part having one end joined to the bonnet top portion and an axially opposite end mounting the bonnet tubular portion first part, the bonnet tubular portion first part including a valve seat mount that, in conjunction with the piston shoulder and the body wall defining the piston second bore portion, forms a second clearance space and has an aperture opening to the second clearance space and the bonnet tubular part, the aperture being part of the passageway.

16. The pressure reducing regulator of claim 14 wherein there is provided fluid seal means in the piston first bore portion that provides a fluid seal between the body tubular portion and the piston, second fluid seal means in the piston second bore portion axially between the bonnet tubular portion first part and the bonnet top portion for forming a fluid seal between the bonnet tubular portion and the piston, the body wall defining the enlarged diametric bore portion, the piston, the bonnet tubular portion and the bonnet top portion forming an annular cavity and the bonnet has a vent port opening to said cavity.

17. A pressure reducing regulator, comprising a regulator body having an upper end, an inlet for pressurized fluid and an axial bore opening through the upper end, the body bore having an axially intermediate bore portion, a bonnet removably mounted to the regulator body and having a top portion with an outlet and an axially elongated tubular portion extending within the body bore, the bonnet tubular portion having a first end part axially opposite the top portion, a piston axially movably extended within the intermediate bore portion and in fluid sealing relationship to the body wall defining the body bore, the piston having a top surface facing the bonnet top portion and an axially opposite bottom surface with the body intermediate bore portion opening thereto, the piston being axially movable along the bonnet tubular portion between a fluid flow open position and a fluid flow blocking position and having a first axial bore portion, and a second bore portion having the bonnet tubular portion extending therein in both of the piston positions and being in fluid communication with the piston first bore portion, first spring means for resiliently urging the piston to move to its open position, the spring means being in abutting relationship to the piston top surface and the bonnet top portion, the bonnet tubular portion having a fluid passageway opening to the outlet and to the piston bore second portion, a valve seat mounted to the bonnet tubular portion first end part and being abuttable against the piston to block fluid flow from the inlet to the passageway when the piston is in its blocking position and to permit fluid flow from the piston first bore portion to the piston second bore portion when the piston is in its open position, and cooperating means for applying pressurized fluid from the inlet to the piston bottom surface and to the tubular portion when the piston is in its open position and pressurized fluid is being applied at the inlet and blocking the application of fluid under pressure to the piston bottom surface and from the inlet to the tubular portion when the piston is in its blocking position, the cooperating means at least in part being defined by the piston and regulator body.

18. The pressure reducing regulator of claim 17, wherein the body bore has an enlarged diametric bore opening to the bonnet top portion and to the body intermediate bore portion, the piston has an enlarged diametric portion in fluid sealing relationship with the body wall defining the body enlarged diametric bore portion and a reduced diameter portion joined to the piston enlarged diametric portion and extending within the body intermediate bore portion to provide an annular clearance space therewith which opens to the piston enlarged diametric portion, the piston bottom surface being provided at least in part by the piston enlarged diametric portion.

19. The pressure reducing regulator of claim 18, wherein the cooperating means includes a piston bore that opens to said clearance space and to the piston second bore portion when the piston is in its open position and fluid under pressure is applied to the inlet.

20. The pressure reducing regulator of claim 17 wherein the cooperating means includes an axially extending regulator body tubular portion that opens to the inlet, is coaxial with the bonnet tubular portion and extends within the piston first bore portion in axially spaced relationship to the bonnet tubular portion and the valve seat, both in the piston open and blocking positions and the piston first bore portion is of a smaller diameter than the piston second bore portion to form an annular shoulder, the valve seat in the blocking position abutting against the piston adjacent to the annular shoulder.

21. The pressure reducing regulator of claim 20 wherein the body bore extends axially through the body, the bonnet tubular portion includes an axially elongated tubular part having a first end part joined to the bonnet top portion and a second end part joined to the tubular portion first end part, the bonnet tubular portion second end part comprising a valve seat mount having a frustoconical outer surface with a minor base axially remote from the tubular portion first part, the bonnet tubular portion second end part in conjunction with the piston annular shoulder, the valve seat and the piston wall that at least in part defines the piston second bore portion providing an annular clearance space when the piston is in its blocking position, the bonnet first tubular part having a bore extending therethrough to open to the outlet and form a part of said passageway and the valve seat mount has an aperture in fluid communication with the bonnet tubular part bore and said annular clearance space to form a part of said passageway.

22. The pressure reducing regulator of claim 21 wherein the cooperating means includes a cross bore opening to the above mentioned clearance space and to the body intermediate bore portion and in fluid communication with the piston bottom portion surface, the body bore has an enlarged diametric bore portion opening toward the bonnet top portion and to the body intermediate bore portion to provide an upwardly facing annular shoulder, the piston having an enlarged diametric portion in fluid sealing relationship with the wall that in part defines the body enlarged diametric portion and a second portion joined to the piston enlarged diametric portion and extending within the body intermediate bore portion to provide a second annular clearance with the body wall providing the body intermediate bore portion.

23. The pressure reducing regulator of claim 22 wherein it is mountable to a container of fluid under high pressure and the regulator body includes a valve bore, a neck portion threadedly mountable to the container and having an inlet, and a second passageway opening to the valve bore for fluidly connecting the neck portion inlet to the body tubular portion and a valve member mounted to the regulator body and extending within the valve bore to selectively permit fluid flow from the neck portion inlet to the body tubular portion and block fluid flow from the neck portion inlet to the body tubular portion.

24. An inline flow control device comprising a housing having an upper end, a high pressure inlet, a tubular portion and an axial bore opening to the inlet and through the housing tubular portion and the housing upper end, a fitting mounted to extend within the housing bore in axial spaced relationship to the housing tubular portion and having a top portion, an outlet opening through the top portion, a tubular portion extending downwardly from the top portion and a fluid passageway opening to the outlet and through the fitting tubular portion, a piston movable axially within the housing bore and having a bore extending axially therethrough, the piston having a top portion with the fitting tubular portion extended in the piston bore and in fluid sealing relationship with the fitting tubular portion and a lower piston portion having the housing tubular portion extended in the piston bore and in fluid sealing relationship with housing tubular portion, the piston being axially movable in the housing bore and along the tubular portions between a piston fluid flow open position and a fluid flow closed position, the piston and the tubular portions having cooperating means for providing a fluid flow path between the housing tubular portion and the fitting passageway when the piston is in its fluid flow open position and blocking the fluid flow path when the piston is in its fluid flow closed position, means in the housing bore for resiliently urging the piston to its fluid flow closed position and means for applying pressure to the piston top portion to move the piston from its fluid flow closed position to its fluid flow open position.

25. The inline flow control device of claim 24 wherein the means for applying a pressure comprises a spring in the housing bore and acting between the fitting and the piston top portion for moving the piston to its open position when the fluid pressure at the outlet is below a preselected level, the housing bore has a first bore portion opening to the fitting and a second bore portion opening to the first bore portion and of a smaller diameter than the first bore portion to provide an upwardly facing shoulder and the piston top portion is in fluid sealing relationship to the wall defining the housing first bore portion and the piston lower portion is joined to the piston top portion to move therewith and extends within the housing second bore portion.

26. The inline flow control device of claim 24 wherein the piston has a bottom surface portion and a flow path in fluid communication with the cooperating means flow path and to the piston bottom surface portion in both of the piston positions to apply substantially the same fluid pressure to the piston bottom surface portion as that in the fitting passageway and the means for applying pressure comprises one of a spring abutting against the piston top portion for moving the piston to its open position when the pressure at the outlet is below a preselected level and a fluid signal port opening to the housing bore between the fitting and the piston top portion for applying pressurized fluid to move the piston from its closed position to its open position.

27. The inline flow control device of claim 24 wherein the piston has a bottom surface portion, the housing tubular portion has an outer peripheral surface, the fitting tubular portion has a lower end part extending within the piston bore to, in cooperation with the piston wall defining the piston bore, form an annular chamber that comprises part of the cooperating means and the piston has a passage for conducting fluid between the annular chamber and the piston bottom surface portion.

28. The inline flow control device of claim 27 wherein the piston bore has a top bore portion and a lower bore portion of a smaller diameter than the top bore portion that opens to the top bore portion to provide an upwardly facing annular shoulder, the annular chamber in part being defined by the piston top bore portion and the annular shoulder, the fitting tubular portion has a lower part extending axially within the piston top bore portion in axially spaced relationship to the housing tubular portion and the cooperating means includes a valve seat abuttable against the annular shoulder to block fluid flow between the tubular portions when the piston is in its closed position and axially spaced from the annular shoulder when the piston is in its open position, the fitting tubular portion lower part having the valve seat.

29. The inline flow control device of claim 26 wherein the piston top portion is an enlarged diameter portion in fluid sealing relationship to wall defining the housing bore, the piston lower portion is of an outer diameter less than that of the enlarged diametric portion and is in radial spaced relationship to the wall defining the housing bore to provide an annular clearance space.

30. The inline flow control device of claim 24 wherein the means for applying pressure to the piston top portion is a signal fluid port opening to the housing bore between the fitting and the piston top portion for applying fluid under pressure for moving the piston from its valve closed position to its valve open position.

31. The inline flow control device of claim 30 wherein the housing has a leakage port opening to the housing bore, the fitting tubular portion has a lower end part extending within the piston bore to, in cooperation with the piston wall defining the piston bore, form an annular chamber that comprises at least part of the cooperating means, the piston has first seal means for forming a fluid seal between the top piston portion and the wall defining the housing bore, and second seal means for forming a fluid seal between the lower piston portion and the fitting tubular portion lower end part, the second seal means being axially between the first seal means and said chamber, the piston lower portion is of an outer diameter to be radially spaced from the adjacent part of the housing wall defining the housing bore to provide a clearance spaced from the leakage port to piston top portion, the piston top portion being axially movable relative to the piston lower portion to permit fluid communication between said chamber and the last mentioned clearance space.

32. The inline flow control device of claim 30 wherein the housing tubular portion has a bottom annular part and a top annular part of a smaller outer diameter than the bottom annular part to intersect the bottom part to form an upwardly facing, first annular shoulder, the piston bore in the piston lower portion has a top first bore part in fluid sealing relationship to the fitting tubular portion, an axial intermediate second bore part that opens to the first bore part to form an upwardly facing, second annular shoulder that in cooperation with the fitting and piston lower portion to provide an annular chamber that defines, at least in part, the cooperating means, and a lower bore part of a larger diameter than the intermediate bore part and opening thereto to form a downwardly facing annular third shoulder, the inner and outer diameters of the annular shoulders being substantially the same, the lower bore part being in fluid sealing relationship with the housing lower part and the piston having a fluid passage that in both of the piston positions opens to the chamber and between the first and third shoulder.

33. The inline flow control device of claim 30 wherein the cooperating means includes a fitting valve seat abuttable against the second shoulder to block fluid flow from the housing tubular portion to the annular chamber when the piston is in its blocking position and is axially spaced from the second shoulder to permit fluid flow from the housing tubular portion to the fitting passageway when the piston is in its open position.

34. Inline flow control apparatus, comprising a housing having an inlet, an upper end, a bottom wall remote from the upper end, an axial bore opening through the housing upper end and having a bore portion that is in part defined by the bottom wall and a tubular portion extending within and opening to the housing bore portion and to the inlet, a piston extended within the housing bore and being movable between a fluid flow open position and a closed position to block fluid flow, means for applying a force to move the piston to its open position, the piston having a bore extending axially therethrough and an annular shoulder within the bore, a bonnet removable mounted to the housing and having a top portion, an outlet and a tubular portion extending within the piston bore coaxially with the housing tubular portion and in axial spaced relationship thereto, the bonnet having a fluid passageway opening to the outlet and to the piston bore portion, a valve seat mounted to the bonnet tubular portion for being abuttable against the shoulder in the piston closed position to block fluid flow from the inlet to the passageway and therethrough to the outlet and spring means for resiliently retaining the piston in its closed position when fluid under pressure is apply at the inlet and at least until the pressure at the outlet is below the desired level.

* * * * *